(12) United States Patent
Ogo et al.

(10) Patent No.: US 6,656,589 B2
(45) Date of Patent: Dec. 2, 2003

(54) POLYAMIDE RESIN PELLET FOR A MINIATURE PART

(75) Inventors: Yoshimasa Ogo, Yamaguchi (JP); Tadayoshi Shiomura, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/020,918

(22) Filed: Dec. 19, 2001

(65) Prior Publication Data

US 2002/0115818 A1 Aug. 22, 2002

(30) Foreign Application Priority Data

Dec. 20, 2000 (JP) ........................................ 2000-387491

(51) Int. Cl.$^7$ ................................................. B32B 5/16
(52) U.S. Cl. .................... 428/402; 428/474.4; 528/310; 523/303; 523/307; 264/171.23; 264/331.18; 264/478
(58) Field of Search ............................ 428/402, 474.4; 523/303, 307; 264/478, 171.23, 331.19; 528/310

(56) References Cited

U.S. PATENT DOCUMENTS 3,981,840 A * 9/1976 Yamamoto et al. ......... 523/303

4,950,515 A * 8/1990 Mason et al. ............ 428/36.92
5,024,897 A * 6/1991 Mason et al. ............ 428/474.4

FOREIGN PATENT DOCUMENTS

| JP | 62-085908 A | 4/1987 |
| JP | 02-092508 A | 4/1990 |

* cited by examiner

Primary Examiner—Leszek Kiliman
(74) Attorney, Agent, or Firm—Birch, Stewart, Kolasch & Birch, LLP

(57) ABSTRACT

A polyamide resin pellet for a miniature part, comprising a polyamide resin (A) whose melting point as measured by DSC is in the range of 280 to below 330° C., which has an average volume of 0.001 to 21 mm$^3$, the average volume determined by randomly sampling 50 pellets, measuring the weight and specific gravity of each of the pellets and dividing the weight by the specific gravity. The polyamide resin pellet exhibits low water absorption and is excellent in moldability, mechanical strength characteristics and heat resistance. Further, it has specified average volume, configuration, average diameter and average length, so that, in an injection molding, plasticization is smoothly effected to thereby enable obtaining a molded item or article which exhibits low dispersion of weight and strength and has excellent hue. The polyamide resin pellet is especially suitable for use in a molding material for forming miniature parts for motor vehicles and electrical or electronic equipments.

8 Claims, 1 Drawing Sheet

POLYAMIDE RESIN PELLET FOR A MINIATURE PART

FIELD OF THE INVENTION

The present invention relates to a polyamide resin pellet for a miniature part. More particularly, the present invention relates to a polyamide resin pellet which is excellent in heat resistance and low water absorption and exhibits low appearance discoloration and which is capable of providing a molded item or article having a low dispersion of weight and strength and is especially suitable for use in a molding material for forming miniature parts for, for example, motor vehicles and electrical or electronic equipments, and relates to a molded item or article produced from the polyamide resin pellet.

BACKGROUND OF THE INVENTION

For example, nylon 6 and nylon 66 are widely known as polyamides. In recent years, the demand for a thermoplastic polymer of high heat resistance has increased, and high-melting-point polyamide 46 (which is a polyamide constituted of 1,4-diaminobutane component and adipic acid component, hereinafter referred to simply as "PA46", having a melting point of 290 to 295° C.) and semiaromatic polyamide (having a melting point of 280 to 330° C.) have been developed.

These polyamides are widely used as a molding material for, for example, injection molding. The polyamides are often used in motor vehicle parts and parts for electrical or electronic equipments, in particular, connectors.

In recent years, in accordance with the miniaturization of electrical or electronic equipments, molded articles as parts thereof have been miniaturized. Accordingly, with respect to the injection molding machine used for forming such molded articles, one of small screw diameter has become employed.

However, these polyamides have a high melting point, and the plasticization thereof in a screw of injection molding machine is difficult. When polyamide resin pellets of the size conventionally employed for molding materials are used, the reduction of screw diameter has caused such a problem that the plasticization thereof cannot be smoothly effected to thereby invite shear heat buildup at a compression zone of screw, which leads to discoloration of molded articles, and that a measuring time is dispersed to thereby increase the dispersion of weight and strength of molded items or articles.

In these circumstances, there is a strong demand for the development of a molding material which is excellent in heat resistance and low water absorption, exhibits low appearance discoloration and is capable of providing a molded item or article having a low dispersion of weight and strength, which molding material is especially suitable for use in miniature parts for motor vehicles and electrical or electronic equipments.

OBJECT OF THE INVENTION

The present invention has been made with a view toward solving the above problems. Accordingly, it is an object of the present invention to provide a polyamide resin pellet which is excellent in heat resistance and low water absorption, exhibits low appearance discoloration and is capable of providing a molded item or article having a low dispersion of weight and strength, which polyamide resin pellet is especially, useful as a molding material for forming miniature parts for, for example, motor vehicles and electrical or electronic equipments. It is another object of the present invention to provide a molded item or article produced from the polyamide resin pellet.

SUMMARY OF THE INVENTION

In an essential aspect of the present invention, there is provided a polyamide resin pellet for a miniature part, comprising a polyamide resin (A) whose melting point as measured by DSC is in the range of 280 to below 330° C., which pellets have an average volume of 0.001 to 21 mm$^3$, the average volume determined by randomly sampling 50 pellets, measuring the weight and specific gravity of each of the pellets and dividing the weight by the specific gravity.

In another aspect of the present invention, there is provided a polyamide resin pellet for a miniature part, comprising a polyamide resin (A) whose melting point as measured by DSC is in the range of 280 to below 330° C., which has a circular or elliptic section having an average diameter of 0.5 to 3.0 mm and which has an average length of 1.0 to 3.0 mm, the average length determined by randomly sampling 50 pellets, measuring the length of each of the pellets by means of calipers and calculating an average of measured lengths, the average diameter determined by randomly sampling 50 pellets, measuring the maximum diameter (major axis in the case of an ellipse) and minimum diameter (minor axis in the case of an ellipse) of each of the pellet sand averaging them, and calculating an average of averaged diameters with respect to all the pellets.

The polyamide resin (A) for use in the present invention is preferably either PA 46 or a semiaromatic polyamide, the semiaromatic polyamide comprising:

diamine component (a) composed of component units of a linear aliphatic diamine having 4 to 12 carbon atoms and/or component units of a side-chain-having aliphatic diamine having 4 to 12 carbon atoms, and dicarboxylic acid component (b) composed of 40 to 100 mol % of terephthalic acid component units, 0 to 60 mol % of component units of an aromatic dicarboxylic acid other than terephthalic acid and/or 0 to 60 mol % of component units of an aliphatic dicarboxylic acid having 4 to 20 carbon atoms, the PA 46 or the semiaromatic polyamide having an intrinsic viscosity of 0.5 to 3.0 dl/g as measured in 96.5% concentrated sulfuric acid at 25° C.

In the polyamide resin pellet for a miniature part according to the present invention, it is preferred that the polyamide resin pellet consist of a polyamide resin composition comprising the polyamide resin (A) and at least one compounding additive selected from among an inorganic and/or organic reinforcement (B), an organic and/or inorganic fire retardant additive (C) and an impact modifier (D) constituted of a rubber or an elastomer, which polyamide resin composition contains component (A) in an amount of 20% by weight or more, component (B) in an amount of 60% by weight or less, component (C) in an amount of 40% by weight or less and component (D) in an amount of 40% by weight or less, based on the total weight of components (A) to (D).

In a further aspect of the present invention, there is provided a molded item of polyamide resin produced by molding the above polyamide resin pellet for a miniature part by means of an injection molding machine of 20 mm or less plasticization screw diameter and 3.5 mm or less plasticization region feed depth.

The molded item of polyamide resin according to the present invention preferably has a total weight of 5 g or less.

In still a further aspect of the present invention, there is provided a process for producing a molded item of polyamide resin, comprising molding the above polyamide resin pellet for a miniature part by means of an injection molding machine of 20 mm or less plasticization screw diameter and 3.5 mm or less plasticization region feed depth.

The process of the present invention is suitable for forming a molded item having a total weight of 5 g or less.

DETAILED DESCRIPTION OF THE INVENTION

Figure 1:
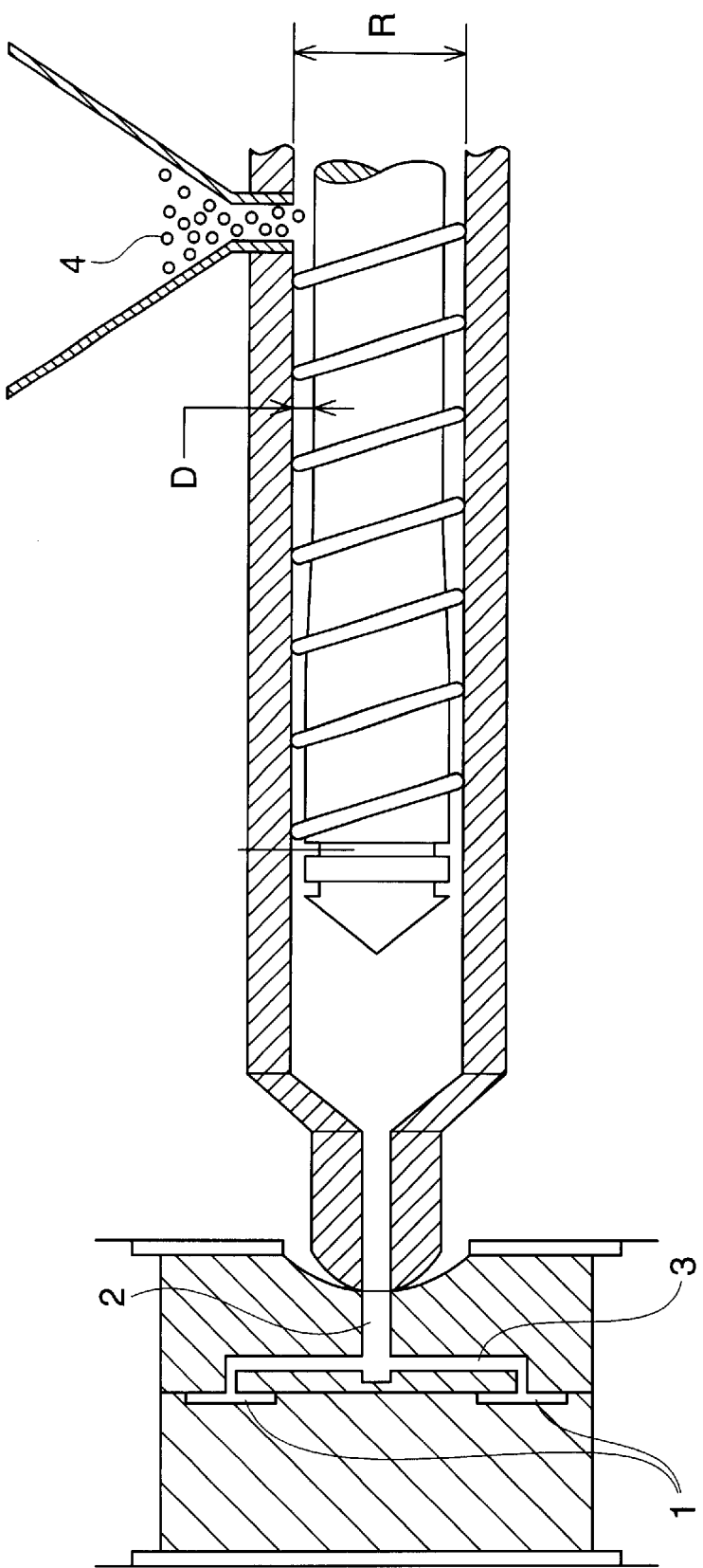
FIG. 1 is a schematic view of typical injection molding machine.

The polyamide resin pellet for a miniature part according to the present invention will be described in detail below.

The polyamide resin pellet for a miniature part according to the present invention contains the polyamide resin (A) and may further contain at least one compounding additive selected from among an inorganic and/or organic reinforcement (B), an organic and/or inorganic fire retardant additive (C) and an impact modifier (D) constituted of a rubber or an elastomer.

Polyamide Resin (A)

Polyamide 46 or a semiaromatic polyamide is used as the polyamide resin (A) for the present invention. Polyamide 46 is a polyamide constituted of component unit derived from 1,4-diaminobutane and component unit derived from adipic acid, hereinafter referred to simply as "PA46".

The PA 46 or semiaromatic polyamide has a melting point of 280 to below 330° C. as measured by DSC.

Although the semiaromatic polyamide for use in the present invention is not particularly limited as long as the melting point is in the above range, the following semiaromatic polyamide (A-1) is preferably employed.

The semiaromatic polyamide (A-1) is composed of diamine component (a) and dicarboxylic acid (b).

The diamine component (a) as a constituent of the semiaromatic polyamide (A-1) is preferably composed of component units of a linear aliphatic diamine having 4 to 12 carbon atoms and/or component units of a side-chain-having aliphatic diamine having 4 to 12 carbon atoms.

Providing that the diamine component (a) amounts to 100 mol %, it is preferred that the sum of the component units of linear aliphatic diamine having 4 to 12 carbon atoms and the component units of side-chain-having aliphatic diamine having 4 to 12 carbon atoms be 100 mol %.

As the diamine component (a), use is made of component units of a linear alkylenediamine having 4 to 12 carbon atoms and/or component units of an alkylenediamine having a side-chain alkyl group and having 4 to 12 carbon atoms.

As the component units of a linear alkylenediamine having 4 to 12 carbon atoms, there can be mentioned, for example, component units derived from any of 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane and a combination thereof. Of these, component units derived from a linear alkylenediamine having 6 to 10 carbon atoms are preferred.

Component units derived from 1,6-diaminohexane, 1,9-diaminononane and 1,10-diaminodecane are still preferably employed. Component units derived from 1,6-diaminohexane are yet still preferably employed.

Among the component units of an alkylenediamine having a side-chain alkyl group and having 4 to 12 carbon atoms, component units of an alkylenediamine having 6 to 10 carbon atoms are especially preferred. Examples thereof can be as follows:

component units derived from an alkylenediamine whose total number of carbon atoms is 6, such as component units derived from 2-methyl-1,5-diaminopentane;

component units derived from an alkylenediamine whose total number of carbon atoms is 7, such as component units derived from 2-methyl-1,6-diaminohexane, 3-methyl-1,6-diaminohexane, 2,2-dimethyl-1,5-diaminopentane, 2,4-dimethyl-1,5-diaminopentane or 3,3-dimethyl-1,5-diaminopentane;

component units derived from an alkylenediamine whose total number of carbon atoms is 8, such as component units derived from 2-methyl-1,7-diaminoheptane, 3-methyl-1,7-diaminoheptane, 4-methyl-1,7-diaminoheptane, 2,2-dimethyl-1,6-diaminohexane, 2,4-dimethyl-1,6-diaminohexane, 2,5-dimethyl-1,6-diaminohexane or 3,3-dimethyl-1,6-diaminohexane;

component units derived from an alkylenediamine whose total number of carbon atoms is 9, such as component units derived from 2-methyl-1,8-diaminoheptane, 3-methyl-1,8-diaminoheptane, 4-methyl-1,8-diaminooctane, 2,3-dimethyl-1,7-diaminoheptane, 2,4-dimethyl-1,7-diaminoheptane, 2,5-dimethyl-1,7-diaminoheptane, 2,2-dimethyl-1,7-diaminoheptane, 2,2,4-trimethyl-,6-diaminohexane or 2,4,4-trimethyl-1,6-diaminohexane; and component units derived from an alkylenediamine whose total number of carbon atoms is 10, such as component units derived from 2-methyl-1,9-diaminononane, 3-methyl-1,9-diaminononane, 4-methyl-1,9-diaminononane, 5-methyl-1,9-diaminononane, 1,3-dimethyl-1,8-diaminooctane, 1,4-dimethyl-1,8-diaminooctane, 2,2-dimethyl-1,8-diaminooctane, 2,4-dimethyl-1,8-diaminooctane, 3,4-dimethyl-1,8-diaminooctane, 4,5-dimethyl-1,8-diaminooctane or 2,4-diethyl-1,6-diaminohexane.

The dicarboxylic acid component (b) as a constituent of the semiaromatic polyamide (A-1) for use in the present invention is preferably composed of 40 to 100 mol % of terephthalic acid component units and 0 to 60 mol % of component units of an aromatic dicarboxylic acid other than terephthalic acid and/or 0 to 60 mol % of component units of an aliphatic dicarboxylic acid having 4 to 20 carbon atoms.

As the component units of an aromatic dicarboxylic acid other than terephthalic acid, there can be mentioned, for example, those of isophthalic acid, 2-methylterephthalic acid, naphthalenedicarboxylic acid and a combination thereof.

The component units of an aliphatic dicarboxylic acid, although the number of carbon atoms thereof is not particularly limited, are preferably those derived from an aliphatic dicarboxylic acid having 4 to 20 carbon atoms, still preferably 4 to 12 carbon atoms.

Examples of aliphatic dicarboxylic acids employed for deriving these aliphatic dicarboxylic acid component units include succinic acid, adipic acid, suberic acid, azelaic acid, sebacic acid, decanedicarboxylic acid, undecanedicarboxylic acid and dodecanedicarboxylic acid. Of these, adipic acid is especially preferred.

The dicarboxylic acid component (b) may contain a small amount, for example, 10 mol % or less of polycarboxylic acid component units together with the above terephthalic acid component units, component units of an aromatic dicarboxylic acid other than terephthalic acid and aliphatic dicarboxylic acid component units.

Examples of such polycarboxylic acid component units include those derived from a tribasic acid or polybasic acid, such as trimellitic acid or pyromellitic acid.

With respect to the above semiaromatic polyamide or PA 46 for use in the present invention, it is preferred that the intrinsic viscosity thereof as measured in 96.5% concentrated sulfuric acid at 25° C. be in the range of 0.5 to 3.0 dl/g, especially. 0.5 to 2.5 dl/g, and still especially 0.6 to 2.0 dl/g.

The semiaromatic polyamide has a high melting point, which is in the range of 280 to below 330° C. Among the semiaromatic polyamides whose melting point falls within the above temperature range, semiaromatic polyamides having a melting point of 290 to below 330° C., especially 295 to 320° C., are preferred from the view point that they have highly excellent moldability and heat resistance.

In Organic and/or Organic Reinforcement (B)

As the inorganic and/or organic reinforcement (B) for use in the present invention, there can be mentioned various inorganic and/or organic reinforcements having the morphology of, for example, fibers, powder, particles, plates, needles, cloths or mats.

Specifically, as fibrous inorganic reinforcements, there can be mentioned, for example, glass fiber, potassium titanate fiber, metal-clad glass fiber, ceramic fiber, wollastonite fiber, metal carbide fiber, metallic cured fiber, asbestos fiber and boron fiber. As fibrous organic reinforcements, there can be mentioned, for example, aramid fiber and carbon fiber.

Of these fibrous reinforcements, glass fiber is especially preferred. The use of glass fiber enhances not only the moldability of polyamide composition but also the mechanical properties, such as tensile strength, flexural strength and flexural modulus, and heat resistance properties, such as heat distortion temperature, of molding from a thermoplastic resin composition.

With respect to the above fibrous reinforcements, the average length is generally in the range of 0.01 to 20 mm, preferably 0.1 to 6 mm, and the aspect ratio is generally in the range of 5 to 2000, preferably 30 to 600. Using fibrous reinforcements whose average length and aspect ratio are in the above ranges is preferred. The polyamide composition can be loaded with these fibrous reinforcements generally in an amount of 60% by weight or less, preferably 5 to 60% by weight, and still preferably 15 to 50% by weight. When the content of fibrous reinforcements is in the above ranges, the polyamide composition exhibits high heat distortion temperature and enhanced high-temperature rigidity.

As various reinforcements having the morphology of, for example, powder, particles, plates, needles, cloths or mats, other than the above fibrous reinforcements, for use in the present invention, there can be mentioned, for example, powdery or plate-shaped inorganic compounds such as silica, silica alumina, alumina, calcium carbonate, titanium dioxide, talc, wollastonite, diatom earth, clay, kaolin, spherical glass, mica, gypsum, red iron oxide, magnesium oxide and zinc oxide, and needle-shaped inorganic compounds such as potassium titanate and whisker. With respect to these reinforcements, it is generally preferred that the average particle diameter be in the range of 0.1 to 200 μm, especially 1 to 100 μm.

These organic and inorganic reinforcements can be used individually or in combination.

Further, these reinforcements can be treated with a surface treatment, such as a silane coupling agent or a titanium coupling agent, before use. For example, the reinforcements are preferably surface treated with an epoxy, urethane, urethane/maleic acid modified or urethane/amine modified compound, or a compound such as vinyltriethoxysilane, 2-aminopropyltriethoxysilane or 2-glycidoxypropyltriethoxysilane.

Organic and/or Inorganic Fire Retardant Additive (C)

The fire retardant additive for use in the present invention includes an organic fire retardant additive and an inorganic fire retardant additive.

As the organic fire retardant additive, especially preferred use is made of a halogenated polystyrene (i) and/or a halogenated phenol condensate (ii).

As the halogenated polystyrene for use in the present invention, there can be mentioned a polymer of the general formula:

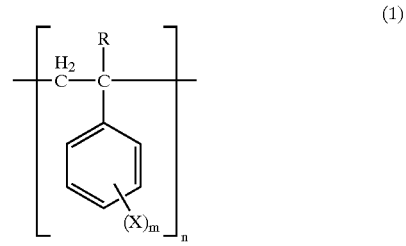

wherein R represents H or CH$_3$, X represents Br or Cl, m is an integer of 1 to 5, and n is an integer of 2 or greater. The halogenated polystyrene represented by the general formula (1) can be, for example, any of polydibromostyrene, polytribromostyrene, polypentabromostyrene, polydichlorostyrene, polytrichlorostyrene, polypentachlorostyrene and polytribromo-α-methylstyrene. Of these halogenated polystyrenes, polytribromostyrene is preferred from the viewpoint that the effect of enhancing fire retardant properties, heat resistance and heat aging resistance is excellent. Also, polydibromostyrene is preferred from the viewpoint that the moldability thereof is excellent. The halogenated polystyrene is produced by polymerizing a halogenated styrene or a halogenated α-methylstyrene, or by halogenating polystyrene or poly-α-methylstyrene.

The halogenated phenol condensate for use in the present invention is represented by the general formula:

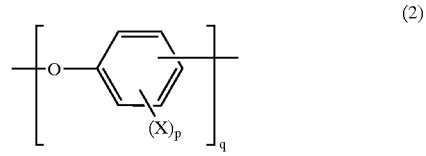

wherein X represents Br or Cl, p is an integer of 1 to 4, and q is an integer of 5 or greater. The halogenated phenol condensate represented by the general formula (2) can be, for example, any of polydibromo-p-phenylene oxide, polytribromo-p-phenylene oxide, polydichloro-p-phenylene oxide, polybromo-p-phenylene oxide and polydibromo-o-phenylene oxide. Of these halogenated phenol condensates, polydibromo-p-phenylene oxide is preferred from the viewpoint that the effect of enhancing heat resistance and fire retardant properties is excellent. Among the above halogenated polystyrenes and halogenated phenol condensates as fire retardant additives, polytribromostyrene is especially preferred from the viewpoint that not only is it excellent in the thermal stability at molding of its composition but also its fire retarding effect is excellent.

Metal compounds are preferably used as the inorganic fire retardant additive in the polyamide composition of the present invention. Examples of such metal compounds include metal oxides, such as antimony oxide, zinc oxide, iron oxide and magnesium oxide, and metal borates, such as zinc borate. In particular, sodium antimonate is preferably contained. This sodium antimonate has a chemical composition represented by the formula $NaSbO_3$, and is preferably used in the form of fine particles of 30 μm or less diameter, still preferably 10 μm or less diameter.

The polyamide composition of the present invention preferably further contains magnesium oxide, zinc oxide, a hydrotalcite or a phosphorus compound as a thermal stabilizer. It is preferred that the size of such oxides be as small as possible, and that the particle diameter thereof be 30 μm or less, especially 10 μm or less.

The polyamide composition can be loaded with the above organic fire retardant additive in an amount of e.g. 40% by weight or less, preferably 5 to 40% by weight, and still preferably 10 to 35% by weight. The polyamide composition can be loaded with the above inorganic fire retardant additive in an amount of e.g. 10% by weight or less, preferably 0.1 to 10% by weight, and still preferably 1 to 8% by weight.

In the present invention, it is especially preferred to use an organic fire retardant additive and an inorganic fire retardant additive in combination. With respect to the composition comprising a polyamide and a fire retardant additive according to the present invention, not only is it excellent in fire retardant properties but also a metal mold contamination thereof at molding is slight Therefore, the composition is suitable for use in, for example, reflow solder parts.

Impact Modifier (D)

The polyamide resin composition of the present invention may be loaded with a rubber or an elastomer as an impact modifier according to necessity. As the rubber or elastomer for use in the present invention, there can be mentioned polyolefins modified by a carboxylic acid and/or a derivative thereof. The loading with modified polyolefins enables improving the prevention of dripping at combustion. As arbitrarily employable modified polyolefins, there can be mentioned, for example, a modified polyolefin, such as modified polyethylene; a modified aromatic vinyl compound/conjugated diene copolymer and a hydride thereof, such as modified SEBS; and a modified polyolefin elastomer, such as modified ethylene/propylene copolymer. These modified polyolefins can arbitrarily be added to the polyamide composition in an amount of 40% by weight or less, preferably 0.1 to 10% by weight, and still preferably 0.1 to 8% by weight.

Other Component

The polyamide resin composition of the present invention may be loaded with, in addition to the above components, other various common compounding agents such as a heat stabilizer, a weather stabilizer, a plasticizer, a thickener, an antistatic agent, a mold release agent, a pigment, a dye, an inorganic or organic filler, a nucleating agent, carbon black and an inorganic compound (for example, talc, clay or mica) in an amount not detrimental to the objectives of the present invention.

Furthermore, the polyamide resin composition of the present invention may contain other various polymers, for example, a polyolefin such as polyethylene, polypropylene or poly-4-methyl-1-pentene, an olefin copolymer such as ethylene/propylene copolymer, ethylene/1-butene copolymer, propylene/ethylene copolymer or propylene/1-butene copolymer, a polystyrene, a polyamide, a polycarbonate, a polyacetal, a polysulfone, polyphenylene oxide, a fluororesin, a silicone resin and an aliphatic polyamide.

Polyamide Resin Composition

The polyamide resin composition as a raw material for forming the polyamide resin pellet of the present invention can be produced by mixing the above components by any of various common means, for example, a Henschel mixer, a V blender, a ribbon blender and a tumbler blender, or produced by effecting such mixing, subsequently melt kneading the mixture by means of, for example, a single screw extruder, multi-screw extruder, a kneader or a Banbury mixer, and thereafter effecting granulation or pulverization.

For example, the polyamide resin composition as a raw material for forming the polyamide resin pellet of the present invention can be produced by heating the above polyamide resin (A) at, for example, 280 to 360° C. into molten form, adding the above fibrous compounding additive, powdery compounding additive and other various additives according to necessity while maintaining the molten form of polyamide resin (A) and kneading the mixture. In this kneading, use can be made of customary kneading devices such as an extruder and a kneader.

It is preferred that the polyamide resin composition as a raw material for forming the polyamide resin pellet of the present invention contain the above polyamide resin (A) and, as a component other than the component (A), at least one compounding additive selected from among an inorganic and/or organic reinforcement (B), an organic and/or inorganic fire retardant additive (C) and an impact resistance improver (D) constituted of a rubber or an elastomer in the following proportion.

It is preferred that the polyamide resin composition for use in the present invention contain component (A) in an amount of 20% by weight or more, especially 20 to 60% by weight, and still especially 30 to 50% by weight; contain component (B) in an amount of 60% by weight or less, especially 10 to 50% by weight, and still especially 15 to 45% by weight; contain component (C) in an amount of 40% by weight or less, especially 10 to 30% by weight, and still especially 15 to 25% by weight; and contain component (D) in an amount of 40% by weight or less, especially 0 to 30% by weight, and still especially 0 to 20% by weight, based on the total weight of components (A), (B), (C) and (D).

When the polyamide resin composition contains at least one compounding additive selected form component (B), component (C) and component (D), it is preferred that the polyamide resin composition contain component (B) in an amount of 300 parts by weight or less, preferably 15 to 250 parts by weight, more preferably 25 to 150 parts by weight; contain component (C) in an amount of 200 parts by weight or less, preferably 15 to 150 parts by weight, more preferably 50 to 85; contain component (D) in an amount of 200 parts by weight or less, preferably 150 parts by weight or less, more preferably 70 parts by weight or less, based on 100 parts by weight of component (A).

When the components are contained in the polyamide resin composition in the above proportion, polyamide resin pellets being excellent in heat resistance, low water absorption, strength characteristics, moldability, etc. can be provided.

Polyamide Resin Pellet

The polyamide resin pellet of the present invention can be obtained by pelletizing the polyamide resin (A) or, for example, the polyamide resin composition prepared in the above manner while varying a die opening diameter, a die L/D, a die temperature and other conditions at melt kneading by means of a twin screw extruder and also varying a cutting speed of cutter. The method for pelletization is, however, not particularly limited.

With respect to the polyamide resin pellet of the present invention, it is preferred that the pellet average volume measured in the following manner be in the range of 0.001 to 21 $mm^3$, especially 6 to 21 $mm^3$, and still especially 6 to 14 $mm^3$.

When the pellet average volume falls within the above range, plasticization can be smoothly effected at injection molding processing, so that a molding material for forming miniature parts for motor vehicles and electrical or electronic equipments which are free from dispersion of weight and strength and exhibit excellent hue can be provided.

In the present invention, the average volume of polyamide resin pellets is determined by randomly sampling 50 pellets, measuring the weight and specific gravity of each of the pellets and dividing the weight by the specific gravity (weight/specific gravity).

With respect to the polyamide resin pellets of the present invention, the shape of section perpendicular to the lengthwise direction of the pellets may be circular or elliptic. The shape of the pellets, although may be circular-cylindric, elliptic-cylindric or spherical, is preferably circular-cylindric or elliptic-cylindric.

With respect to the polyamide resin pellet of the present invention, it is preferred that the pellet average length measured in the following manner be in the range of 1.0 to 3.0 mm, especially. 1.5 to 3.0 mm, and still especially 1.5 to 2.0 mm. Further, it is preferred that the average diameter of section perpendicular to the lengthwise direction of the pellets be in the range of 0.5 to 3.0 mm, especially 2.0 to 3.0 mm, and still especially 2.0 to 2.5 mm.

In the present invention, the pellet average length is determined by randomly sampling 50 pellets, measuring the length of each of the pellets by means of calipers and calculating an average of measured lengths.

Further, in the present invention, the pellet average diameter is determined by randomly sampling 50 pellets, measuring the maximum diameter (major axis in the case of an ellipse) and minimum diameter (minor axis in the case of an ellipse) of each of the pellets and averaging them, and calculating an average of averaged diameters with respect to all the pellets.

When the configuration, average length and average diameter of polyamide resin pellets fall within the above ranges, plasticization can be smoothly effected at injection molding processing, so that a molding material for forming, for example, miniature parts for electrical or electronic equipments which are free from dispersion of weight and strength, are excellent in moldability and exhibit excellent hue can be provided.

The polyamide resin pellets of the present invention exhibit low water absorption and are excellent in moldability, mechanical strength characteristics and heat resistance. Therefore, the polyamide resin pellets are suitable for use in fields wherein these properties are required, in particular, as a molding material for forming, for example, miniature parts for motor vehicles and electrical or electronic equipments. The polyamide resin pellets are especially useful in a molding material for forming a molded item or article having a total weight of 5 g or less, preferably 1 to 3 g.

Polyamide Resin Molding Item or Article

The polyamide resin molding of the present invention can be produced from the above polyamide resin pellets by, for example, the injection molding method.

The process for producing the polyamide resin molding will now be described with reference to a schematic view of typical injection molding machine (FIG. 1).

Preferred process for producing the polyamide resin molding item or article of the present invention, for example, comprises molding the above polyamide resin pellets 4 by means of an injection molding machine of 20 mm or less plasticization screw diameter (R) and 3.5 mm or less plasticization region feed depth (D).

Herein, the term "molded item" refers to molded article 1 having sprue 2 and runner 3.

When the polyamide resin pellets 4 are molded by means of this injection molding machine, plasticization can be smoothly effected even at molding processing of miniature parts, so that a molded item or article which is free from dispersion of weight and strength and exhibits excellent hue can be obtained.

The process by means of the injection molding machine of the above characteristics is suitable for forming, for example, a molded item having a total weight of 5 g or less, especially 1 to 3 g, or a molded article having a weight of 2 g or less, especially 0.1 to 1.0 g.

That is, in the production of a molded item having a total weight of 5 g or less, especially 1 to 3 g, it is preferred to mold the polyamide resin pellets 4 by means of the injection molding machine of 20 mm or less plasticization screw diameter (R) and 3.5 mm or less plasticization region feed depth (D).

A molded item having a total weight of 5 g or less, preferably 1 to 3 g, can be obtained by molding the polyamide resin pellets 4 by means of the above injection molding machine. Molded article 1 having a weight of 2 g or less, preferably 0.1 to 1.0 g, which is free from dispersion of weight and strength and exhibits excellent hue can be obtained by removing unneeded portions, such as sprue portion 2 and runner portion 3, from the obtained molded item.

A representative example of thus obtained molded articles is a connector.

EFFECT OF THE INVENTION

The polyamide resin pellets of the present invention exhibit low water absorption and are excellent in moldability, mechanical strength characteristics and heat resistance. Also, the polyamide resin pellets have the above specified average volume, configuration, average diameter and average length. Therefore, even at injection molding, plasticization can be smoothly effected, so that a molded item or article which is free from dispersion of weight and strength and exhibits excellent hue can be produced. The polyamide resin pellets of the present invention are especially suitable for use in a molding material for forming miniature parts for motor vehicles and electrical or electronic equipments.

EXAMPLE

The present invention will further be illustrated below with reference to the following Examples which in no way limit the scope of the invention.

The materials used for polymer production in Production Examples 1 to 7 are as specified in Table 1 given later.

Production Example 1
Preparation of Semiaromatic Polyamide (PA6T/66=55/45)

20.66 kg (124 mol) of terephthalic acid and 14.8 kg (101 mol) of adipic acid (mixing ratio (molar ratio) of terephthalic acid and adipic acid=55:45) for constituting dicarboxylic acid component units, 26.45 kg (228 mol) of 1,6-diaminohexane for constituting diamine component units, 0 0.048 kg (0.453 mol) of sodium hypophosphite as a catalyst, 0.344 kg (2.82 mol) of benzoic acid as a molecular weight modifier and 6200 ml of ion exchanged water were charged into a 100 lit. reactor, purged with nitrogen, and, while agitating these raw materials, reacted at an internal temperature of 250° C. under a pressure of 35 kg/cm² for 1 hr. Thereafter, the obtained reaction product was transferred into a receiver connected to the reactor, having its pressure set so as to be about 10 kg/cm² lower than that of the reactor. Thus, 55.9 kg of polyamide precursor having an intrinsic viscosity (η) of 0.15 dl/g was obtained. Melt polymerization thereof was carried out at a temperature 20 to 40° C. higher than the polyamide melting point and at a resin feeding rate of 10 kg/h by means of a twin-screw extruder.

Thus, polyamide resin (PA6T/66=55/45) was obtained. With respect to the composition of the polyamide resin, the content of terephthalic acid component units in dicarboxylic acid component units was 55 mol %, while the content of adipic acid component units was 45 mol %. The intrinsic viscosity (η) as measured in 96.5% concentrated sulfuric acid at 25° C. and melting point thereof were 1.0 dl/g and 308° C., respectively.

Production of Polyamide Resin Composition 39.5 parts by weight of thus prepared polyamide resin (PA6T/66=55/45) was loaded with 30 parts by weight of glass fiber (CS03JAFT2A, produced by Asahi Fiber Glass), 25 parts by weight of organic fire retardant additive (polydibromostyrene, PDBS-80), 5 parts by weight of inorganic fire retardant additive (sodium antimonate, Sunepoch NA-1070L produced by Nissan Chemical Industries, Ltd.) and 0.5 part by weight of stabilizer (hydrotalcite, DHT-4C). Melt kneading thereof was carried out at a temperature 10 to 30° C. higher than the melting point of polyamide resin by means of a twin-screw extruder. Thus, a polyamide resin composition was obtained.

Production Example 2

The same polyamide resin (PA6T/66=55/45) as employed in Production Example 1 was used.
Production of Polyamide Resin Composition 45.5 parts by weight of polyamide resin (PA6T/66=55/45) obtained in Production Example 1 was loaded with 30 parts by weight of glass fiber (CSO3JAFT2A, produced by Asahi Fiber Glass), 20 parts by weight of organic fire retardant additive (tribromopolystyrene, 68 PB), 4 parts by weight of inorganic fire retardant additive (sodium antimonate, Sunepoch NA-1070L produced by Nissan Chemical Industries, Ltd.) and 0.5 part by weight of stabilizer (hydrotalcite, DHT-4C). Melt kneading thereof was carried out at a temperature 10 to 30° C. higher than the melting point of polyamide resin by means of a twin-screw extruder. Thus, a polyamide resin composition was obtained.

Production Example 3

The same polyamide resin (PA6T/66=55/45) as employed in Production Example 1 was used.
Production of Polyamide Resin Composition 70 parts by weight of polyamide resin (PA6T/66=55/45) obtained in Production Example 1 was loaded with 30 parts by weight of glass fiber (CS03JAFT2A, produced by Asahi Fiber Glass). Melt kneading thereof was carried out at a temperature 10 to 30° C. higher than the melting point of polyamide resin by means of a twin-screw extruder. Thus, a polyamide resin composition was obtained.

Production Example 4
Preparation of Semiaromatic Polyamide (PA6T/66=65/35)

Semiaromatic polyamide (PA6T/66=65/35) was prepared in the same manner as in Production Example 1, except that 24.380 kg (147 mol) of terephthalic acid and 11.550 kg (79 mol) of adipic acid were charged so that the mixing ratio (molar ratio) of terephthalic acid and adipic acid was 65:35. With respect to the composition of the polyamide resin, the content of terephthalic acid component units in dicarboxylic acid component units was 65 mol %, while the content of adipic acid component units was 35 mol %. The intrinsic viscosity (η) as measured in 96.5% concentrated sulfuric acid at 25° C. and melting point thereof were 1.05 dl/g and 325° C., respectively.
Production of Polyamide Resin Composition Polyamide resin composition was produced in the same manner as in Production Example 1, except that the polyamide resin PA6T/66=65/35 was used in place of the polyamide resin PA6T/66=55/45.

Production Example 5
Preparation of Semiaromatic Polyamide (PA6T/66=45/55)

Semiaromatic polyamide (PA6T/66=45/55) was prepared in the same manner as in Production Example 1, except that 16.880 kg (102 mol) of terephthalic acid and 18.150 kg (124 mol) of adipic acid were charged so that the mixing ratio (molar ratio) of terephthalic acid and adipic acid was 45:55. With respect to the composition of the polyamide resin, the content of terephthalic acid component units in dicarboxylic acid component units was 45 mol%, while the content of adipic acid component units was 55 mol %. The intrinsic viscosity (η) as measured in 96.5% concentrated sulfuric acid at 25° C. and melting point thereof were 0.97 dl/g and 295° C., respectively.
Production of Polyamide Resin Composition Polyamide resin composition was produced in the same manner as in Production Example 1, except that the polyamide resin PA6T/66=45/55 was used in place of the polyamide resin PA6T/66=55/45.

Production Example 6

As the polyamide resin, use was made of PA46 (PA46F5000, produced by Unitika, Ltd.).
Production of Polyamide Resin Composition 45.5 parts by weight of polyamide resin (PA46) was loaded with 30 parts by weight of glass fiber (CS03JAFT2A, produced by Asahi Fiber Glass), 20 parts by weight of organic fire retardant additive (tribromopolystyrene, Pyrocheck 68PB produced by Ferro), 4 parts by weight of inorganic fire retardant additive (antimony trioxide produced by Mikuni Smelting & Refining Co., Ltd.) and 0.5 part by weight of stabilizer (hydrotalcite, DHT-4C) Melt kneading thereof was carried out at a temperature 10 to 30° C. higher than the melting point of polyamide resin by means of a twin-screw extruder. Thus, a polyamide resin composition was obtained.

Production Example 7
Preparation of Semiaromatic Polyamide (PA9T)

46.5 kg (280.1 mol) of terephthalic acid, 45.0 kg (284.3 mol) of nonane diamine component, 0.43 kg (3.5 mol) of benzoic acid, 0.06 kg (0.6 mol) of sodium hypophosphite monohydrate and 27.5 kg of distilled water were charged into an autoclave. The internal part of reaction vessel was satisfactorily purged with nitrogen. The above nonane diamine component consisted of a 81:19 molar ratio mixture of 1,9-diaminononane and 2-methyl-1,8-diaminooctane. While agitating the above raw materials, the internal temperature was raised to 250° C. over a period of 4 hr. Reaction was continued for 1 hr, thereby obtaining a polyamide low condensate. Solid-phase polymerization of the polyamide low condensate was carried out at 190° C. in vacuum for 48 hr. Thereafter, melt polymerization thereof was carried out at a temperature 20 to 40° C. higher than the polyamide melting point and at a resin feeding rate of 10 kg/h by means of a twin-screw extruder. Thus, polyamide resin (PA9T) was obtained. The melting point thereof was 300° C.

Production of Polyamide Resin Composition 39.5 parts by weight of thus prepared polyamide resin (PA9T) was loaded with 30 parts by weight of glass fiber (CS03JAFT2A, produced by Asahi Fiber Glass), 25 parts by weight of organic fire retardant additive (polydibromostyrene, PDBS-80), 5 parts by weight of inorganic fire retardant additive (sodium antimonate, Sunepoch NA-1070L produced by Nissan Chemical Industries, Ltd.) and 0.5 part by weight of stabilizer (hydrotalcite, DHT-4C). Melt kneading thereof was carried out at a temperature 10 to 30° C. higher than the melting point of polyamide resin by means of a twin-screw extruder. Thus, a polyamide resin composition was obtained.

Production Example 8

As the polyamide resin, use was made of PA66 (Amilan CM3001-N, PA66 produced by Toray Industries, Inc.).

Production of Polyamide Resin Composition 45.5 parts by weight of polyamide resin (PA66) was loaded with 30 parts by weight of glass fiber (CS03JAFT2A, produced by Asahi Fiber Glass), 20 parts by weight of organic fire retardant additive (tribromopolystyrene, Pyrocheck 68PB produced by Ferro), 4 parts by weight of inorganic fire retardant additive (antimony trioxide produced by Mikuni Smelting & Refining Co., Ltd.) and 0.5 part by weight of stabilizer (hydrotalcite, DHT-4C). Melt kneading thereof was carried out at a temperature 10 to 30° C. higher than the melting point of polyamide resin by means of a twin-screw extruder. Thus, a polyamide resin composition was obtained.

TABLE 1

| | Polyamide resin (A) | | | Reinforcement (B) glass fiber | Fire retardant additive (C) | | | | stabilizer |
| --- | --- | --- | --- | --- | --- | --- | --- | --- | --- |
| | | | | | org. fire retardant additive | | inorg. fire retardant additive | | |
| | type | m.p. (° C.) | content (wt. %) | content (wt. %) | type | content (wt. %) | type | content (wt. %) | content (wt. %) |
| Production Ex. 1 | PA6T/66 = 55/45 | 308 | 39.5 | 30 | PDBS-80 | 25 | sodium antimonate | 5 | 0.5 |
| Production Ex. 2 | PA6T/66 = 55/45 | 308 | 45.5 | 30 | 68PB | 20 | sodium antimonate | 4 | 0.5 |
| Production Ex. 3 | PA6T/66 = 55/45 | 308 | 70 | 30 | — | — | — | — | — |
| Production Ex. 4 | PA6T/66 = 65/35 | 325 | 39.5 | 30 | PDBS-80 | 25 | sodium antimonate | 5 | 0.5 |
| Production Ex. 5 | PA6T/66 = 45/55 | 295 | 39.5 | 30 | PDBS-80 | 25 | sodium antimonate | 5 | 0.5 |
| Production Ex. 6 | PA46 | 290 | 45.5 | 30 | 68PD | 20 | antimony trioxide | 4 | 0.5 |
| Production Ex. 7 | PA9T | 300 | 39.5 | 30 | PDBS-80 | 25 | sodium antimonate | 5 | 0.5 |
| Production Ex. 8 | PA66 | 265 | 45.5 | 30 | 68PB | | antimony trioxide | 4 | 0.5 |

(1) Glass fiber: glass fiber of 10 $\mu$m diameter having its surface treated with a silane coupling agent (CS03JAFT2A, produced by Asahi Fiber Glass);

(2) Organic fire retardant additive:
  PDBS-80 (polydibromostyrene produced by Great Lakes Chemical), and
  68PB (tribromopolystyrene, Pyrocheck produced by Ferro);

(3) Inorganic fire retardant additive:
  sodium antimonate (Sunepoch NA-1070L produced by Nissan Chemical Industries, Ltd.), and
  antimony trioxide (produced by Mikuni Smelting & Refining Co., Ltd.); and (4) Stabilizer: hydrotalcite (DHT-4C, produced by Kyowa Chemical Industry Co., Ltd.).

Examples 1 to 10, Comparative Examples 1 to 7, and Referential Examples 1 and 2

Various pellets were produced from the polyamide resin compositions specified in Table 2 in the following manner. With respect to the obtained polyamide resin pellets, measuring and evaluation were conducted in the manner described later.

Results are listed in Table 2.

Process for Producing Various Pellets

Cylindrical pellets of varied length and diameter were produced by varying a die opening diameter and varying a cutting speed of cutter at the time of melt kneading by means of a twin-screw extruder.

Process for Producing Molded Item or Article (Miniature Connector) of Polyamide Resin Polyamide resin pellets produced by the above process were molded by means of the following injection molding machine equipped with a metal mold into an item including four miniature connectors together with sprue and runner portions. Four miniature connectors as molded articles were obtained by removing unneeded portions such as sprue and runner portions from the molded item. In the same manner, in total, 50 miniature connectors were formed.

Injection Molding Machine

Model: Fanac α-30, maximum injection capacity: 11 cm$^3$, maximum injection rate: 40 cm$^3$/sec, screw diameter: 16 mm, and screw feed region depth: 3.5 mm.

Metal Mold

Metal mold for miniature connector,
product weight: 2 g (four pieces (including sprue and runner) taken, sprue and runner weight: 1.0 g, and weight of product (connector) : 1.0 g for four pieces (0.25 g for each piece)),
dimension of connector: 3 mm width, 2 mm height and 40 mm length with 80 holes for each connector, and
injection cycle: 10 sec.

Method of Evaluating Pellet-Size Molding of Each Polyamide

The average volume, average length and average diameter of thus obtained pellets were measured and calculated in the following manner.

<Average Volume of Pellet>

The average volume of pellets was determined by randomly sampling 50 pellets, measuring the weight and specific gravity of each of the pellets and dividing the weight by the specific gravity (weight/specific gravity). The specific gravity of pellets was measured in accordance with Japanese Industrial Standard (JIS) K 7112.

<Average Length of Pellet>

The pellet average length was determined by randomly sampling 50 pellets, measuring the length of each of the pellets by means of calipers and calculating an average of measured lengths with respect to all the pellets.

<Average Diameter of Pellet>

The pellet average diameter was determined by randomly sampling 50 pellets, measuring the maximum diameter (major axis in the case of an ellipse) and minimum diameter (minor axis in the case of an ellipse) of each of the pellets by means of calipers and averaging them to thereby obtain a pellet diameter, and calculating an average of obtained diameters with respect to all the pellets.

<Dispersion of Molding Weight>

With respect to the above molded 50 connectors, the dispersion of weight was calculated in terms of σ/average weight (%).

<Dispersion of Molding Strength>

With respect to the above molded 50 connectors, a flexural strength test by three-point supporting in the lengthwise direction (according to ASTM 790, with a span spacing of 20 mm) was performed, and the dispersion of strength was calculated in terms of σ/average strength (%)

<Degree of Molding Discoloration>

With respect to the above molded 50 connectors, the degree of discoloration was evaluated by comparing the hue of each thereof with that of the raw material pellets by visual inspection.

TABLE 2

| | Raw material (polyamide resin) | Cylinder temp (° C.) | Pellet size | | | Dispersion of weight of molding σ/X (%) | Discoloration of molding | Dispersion of flexural strength of σ/X (%) |
|---|---|---|---|---|---|---|---|---|
| | | | av. length (mm) | av. diam. (mm) | av. vol. (mm$^3$) | | | |
| Example 1 | Prod. Ex. 1 | 320 | 2.0 | 2.0 | 6.2 | 0.6 | none | 4 |
| Example 2 | Prod. Ex. 1 | 320 | 2.5 | 2.0 | 7.3 | 0.8 | none | 4 |
| Example 3 | Prod. Ex. 1 | 320 | 2.5 | 2.5 | 11.6 | 1.0 | none | 5 |
| Example 4 | Prod. Ex. 1 | 320 | 3.0 | 2.5 | 14.2 | 1.0 | slightly occured | 6 |
| Example 5 | Prod. Ex. 2 | 320 | 2.0 | 2.0 | 6.1 | 0.7 | none | 4 |
| Example 6 | Prod. Ex. 3 | 320 | 2.5 | 2.0 | 7.5 | 1.0 | none | 5 |
| Example 7 | Prod. Ex. 4 | 330 | 2.5 | 2.0 | 7.4 | 1.4 | none | 8 |
| Example 8 | Prod. Ex. 5 | 310 | 2.5 | 2.0 | 7.2 | 1.2 | none | 6 |
| Example 9 | Prod. Ex. 6 | 300 | 2.5 | 2.0 | 7.0 | 0.8 | none | 5 |
| Example 10 | Prod. Ex. 7 | 300 | 2.5 | 2.0 | 7.2 | 1.0 | none | 7 |
| Comp. Ex. 1 | Prod. Ex. 1 | 320 | 3.5 | 3.2 | 26.1 | 2.7 | occurred | 11 |
| Comp. Ex. 2 | Prod. Ex. 2 | 320 | 3.5 | 3.2 | 26.3 | 3.0 | occurred | 13 |
| Comp. Ex. 3 | Prod. Ex. 3 | 320 | 3.5 | 3.6 | 35.5 | 2.9 | slightly occurred | 11 |
| Comp. Ex. 4 | Prod. Ex. 4 | 330 | 3.5 | 3.6 | 35.3 | 3.4 | slightly occurred | 14 |
| Comp. Ex. 5 | Prod. Ex. 5 | 310 | 3.5 | 3.6 | 34.8 | 3.1 | slightly occurred | 13 |
| Comp. Ex. 6 | Prod. Ex. 6 | 300 | 3.5 | 3.6 | 35.1 | 2.8 | slightly occurred | 10 |
| Comp. Ex. 7 | Prod. Ex. 7 | 300 | 3.5 | 3.6 | 36.0 | 3.2 | slightly occurred | 12 |
| Ref. Ex. 1 | Prod. Ex. 8 | 280 | 2.5 | 2.0 | 7.3 | 1.0 | none | 5 |
| Ref. Ex. 2 | Prod. Ex. 8 | 280 | 3.5 | 3.6 | 35.5 | 1.5 | none | 7 |

What is claimed is:

1. A polyamide resin pellet for a miniature part, comprising a polyamide resin (A) whose melting point as measured by DSC is in the range of 280 to below 330° C., which has an average volume of 0.001 to 21 mm$^3$,
said average volume determined by randomly sampling 50 pellets, measuring the weight and specific gravity of each of the pellets and dividing the weight by the specific gravity.

2. A polyamide resin pellet for a miniature part, comprising a polyamide resin (A) whose melting point as measured by DSC is in the range of 280 to below 330° C., which has a circular or elliptic section having an average diameter of 0.5 to 3.0 mm and which has an average length of 1.0 to 3.0 mm, said average length determined by randomly sampling 50 pellets, measuring the length of each of the pellets by means of calipers and calculating an average of measured lengths, said average diameter determined by randomly sampling 50 pellets, measuring the maximum diameter, major axis in the case of an ellipse, and minimum diameter, minor axis in the case of an ellipse, of each of the pellet sand averaging them, and calculating an average of averaged diameters with respect to all the pellets.

3. The polyamide resin pellet for a miniature part as claimed in claim 1 or 2, wherein the polyamide resin (A) is either polyamide 46 or a semiaromatic polyamide, said semiaromatic polyamide comprising:

diamine component (a) composed of component units of a linear aliphatic diamine having 4 to 12 carbon atoms and/or component units of a side-chain-having aliphatic diamine having 4 to 12 carbon atoms, and dicarboxylic acid component (b) composed of 40 to 100 mol % of terephthalic acid component units, 0 to 60 mol % of component units of an aromatic dicarboxylic acid other than terephthalic acid and/or 0 to 60 mol % of component units of an aliphatic dicarboxylic acid having 4 to 20 carbon atoms, said polyamide 46 or said semiaromatic polyamide having an intrinsic viscosity of 0.5 to 3.0 dl/g as measured in 96.5% concentrated sulfuric acid at 25° C.

4. The polyamide resin pellet for a miniature part as claimed in claim 1, further comprising at least one compounding additive selected from among an inorganic and/or organic reinforcement (B), an organic and/or inorganic fire retardant additive (C) and an impact modifier (D) constituted of a rubber or an elastomer.

5. A molded item of polyamide resin produced by molding the polyamide resin pellet for a miniature part as claimed in claim 1 by means of an injection molding machine of 20 mm or less plasticization screw diameter and 3.5 mm or less plasticization region feed depth.

6. The molded item of polyamide resin as claimed in claim 5, wherein the molded item has a total weight of 5 g or less.

7. A process for producing a molded item of polyamide resin, comprising molding the polyamide resin pellet for miniature part as claimed in claim 1 by means of an injection molding machine of 20 mm or less plasticization screw diameter and 3.5 mm or less plasticization region feed depth.

8. The process as claimed in claim 7, wherein the molded item has a total weight of 5 g or less.

* * * * *